United States Patent [19]

Ho

[11] Patent Number: 4,599,547
[45] Date of Patent: Jul. 8, 1986

[54] FINE-COARSE POSITIONING CONTROL SYSTEM WITH EASY ADJUSTMENT

[75] Inventor: Benedict C. M. Ho, Waterloo, Canada

[73] Assignee: NCR Canada Ltd-NCR Canada LTEE, Mississauga, Canada

[21] Appl. No.: 663,785

[22] Filed: Oct. 23, 1984

[51] Int. Cl.⁴ .............................................. G05B 11/18
[52] U.S. Cl. .................................... 318/594; 318/603; 318/611; 318/640; 318/591
[58] Field of Search ............... 318/594, 611, 592, 591, 318/603, 640, 608, 601, 561; 364/180, 182; 360/75, 77, 78

[56] References Cited

U.S. PATENT DOCUMENTS

| | | | |
|---|---|---|---|
| 3,573,589 | 4/1971 | Berry | 318/601 |
| 3,644,814 | 2/1972 | Firkert | 318/592 |
| 3,670,228 | 6/1972 | Crosby | 318/594 |
| 3,710,223 | 1/1973 | Cottiell | 318/594 X |
| 3,976,929 | 8/1976 | Rodier | 318/594 |
| 4,134,053 | 1/1979 | Klinger | 318/594 X |
| 4,219,766 | 8/1980 | Lin | 318/594 |
| 4,345,192 | 8/1982 | Kohzai et al. | 318/592 |
| 4,353,019 | 10/1982 | Sweeney | 318/592 X |
| 4,429,267 | 1/1984 | Veale | 318/594 |

Primary Examiner—William M. Shoop, Jr.
Assistant Examiner—Patrick C. Keane
Attorney, Agent, or Firm—Wilbert Hawk, Jr.; Albert L. Sessler, Jr.

[57] ABSTRACT

A system and method are disclosed for precisely positioning a movable member to a desired fine position after a selected coarse position is reached. In a preferred embodiment of the invention a processor-controlled typewheel servo control system is responsive to a command signal for a selected coarse position for selectively utilizing from a memory circuit preselected stored adjustment information for the selected coarse position comprised of an associated coarse position count and quadrant information related to the sinusoids generated by an optical encoder in order to make a precise fine position adjustment in the position of a typewheel after the selected coarse position is reached for that typewheel.

20 Claims, 7 Drawing Figures

FINE-COARSE POSITIONING CONTROL SYSTEM WITH EASY ADJUSTMENT

BACKGROUND OF THE INVENTION

1. Field of the Invention

The present invention relates to positioning control systems and more particularly to an improved typewheel servo control system for precisely positioning a typewheel to a desired fine position after a selected coarse position is reached.

2. Description of the Prior Art

In conventional typewheel servo control systems, the characters of a typewheel are separated from each other by an angular distance which is represented by a fixed number of lines of an optical encoder disk. The encoder disk and the typewheel are coupled directly or indirectly to a servo motor shaft. Such character separations are interpreted by the servo control system as being fixed with respect to each other. However, in practice they may vary significantly due to factors such as optical disk tolerance; motor run-out, mechanical tolerances of the system and typewheel tolerance. As a result, typewheels of extremely tight tolerance must be used in order to achieve good print quality. In addition, optical disks with a large number of lines must be used to achieve acceptable resolution.

The background art known to the applicant at the time of the filing of this application is as follows:

U.S. Pat. No. 3,573,589, Position Servo System For A Motor Including Detenting at Destination, by J. Berry;

U.S. Pat. No. 3,644,814, Fine Positioning System, by G. Firkert;

U.S. Pat. No. 3,976,929, Device For The Exact Positioning of a Movable Part, by R. J. Rodier;

U.S. Pat. No. 4,345,192, Control System For Stopping Spindle At Predetermined Rotational Position, by Y. Kohzai et al; and U.S. Pat. No. 4,429,267, Digital Positioning Systems Having High Accuracy, by J. R. Veale.

SUMMARY OF THE INVENTION

Briefly, a processor-controlled typewheel servo control system is provided which selectively utilizes from a memory circuit preselected stored coarse position counts and adjustment or quadrant information related to the sinusoids generated by an optical encoder to make a precise fine position adjustment in the position of a typewheel after a selected coarse position is reached for that typewheel.

It is therefore an object of this invention to provide an improved typewheel servo control system for precisely positioning a typewheel to a desired fine position after a selected coarse position is reached.

Another object of this invention is to provide a system and method for positioning a movable member with a high degree of accuracy.

Another object of this invention is to provide a system and method for precisely moving a movable member from a present rotational position to a preselected fine position associated with a selected coarse rotational position.

A further object of this invention is to provide a processor-controlled typewheel servo control system which selectively utilizes stored preselected fine position information respectively associated with coarse angular positions of the typewheel to precisely position the typewheel when a coarse angular position of the typewheel is selected.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Although the invention will be discussed in relation to its application to a typewheel servo control system for precisely positioning a typewheel to a desired fine position after a selected coarse position is reached, it should be realized that the invention could readily be utilized in a variety of other applications to precisely position any suitable movable member such as, for example, a motor shaft, an antenna, an optical sensor and a machine tool.

Figure 1:
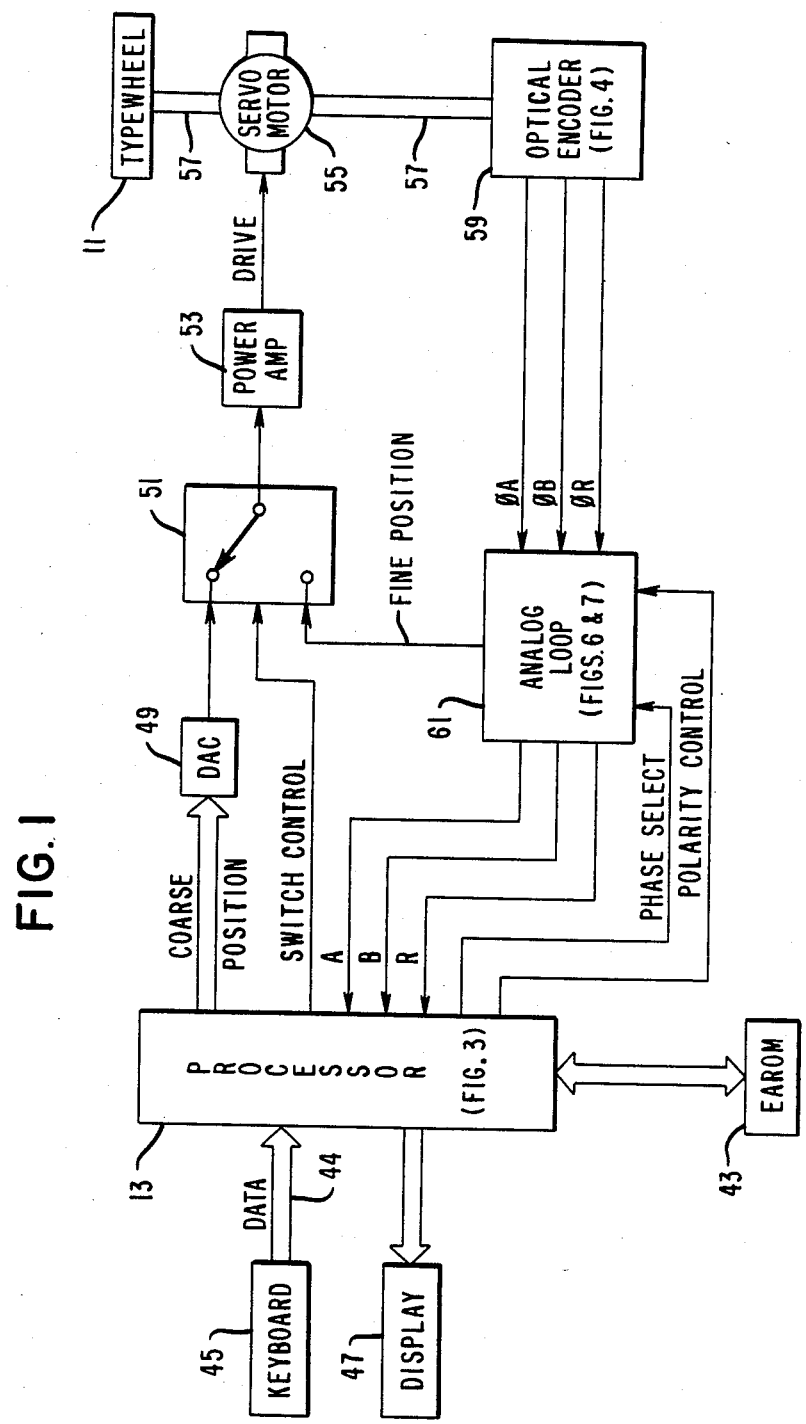
FIG. 1 is a schematic block diagram of a preferred embodiment of the servo control system of the invention.
Figure 2:
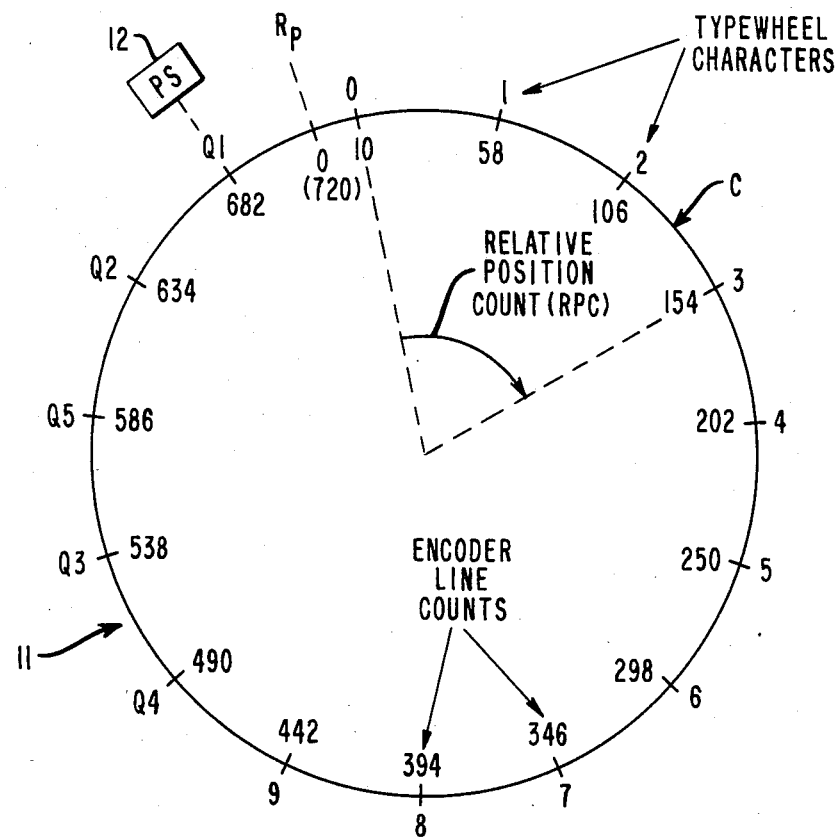
FIG. 2 illustrates a simplified portion of the typewheel of FIG. 1, showing the standard coarse positions of various characters around the periphery of the typewheel in relation to the line counts of the encoder of FIG. 1.

Referring now to the drawings, FIG. 1 illustrates a schematic block diagram of a servo control system for precisely controlling the positioning of a rotatable printwheel or typewheel 11 to a print station (PS) 12 according to the invention. As shown in FIG. 2, the typewheel 11 has exemplary characters 0, 1, 2, 3, 4, 5, 6, 7, 8, 9, Q4, Q3, Q5, Q2 and Q1 equally-spaced from each other in a clockwise direction around its exemplary 720-position periphery or circumference C.

Figure 3:
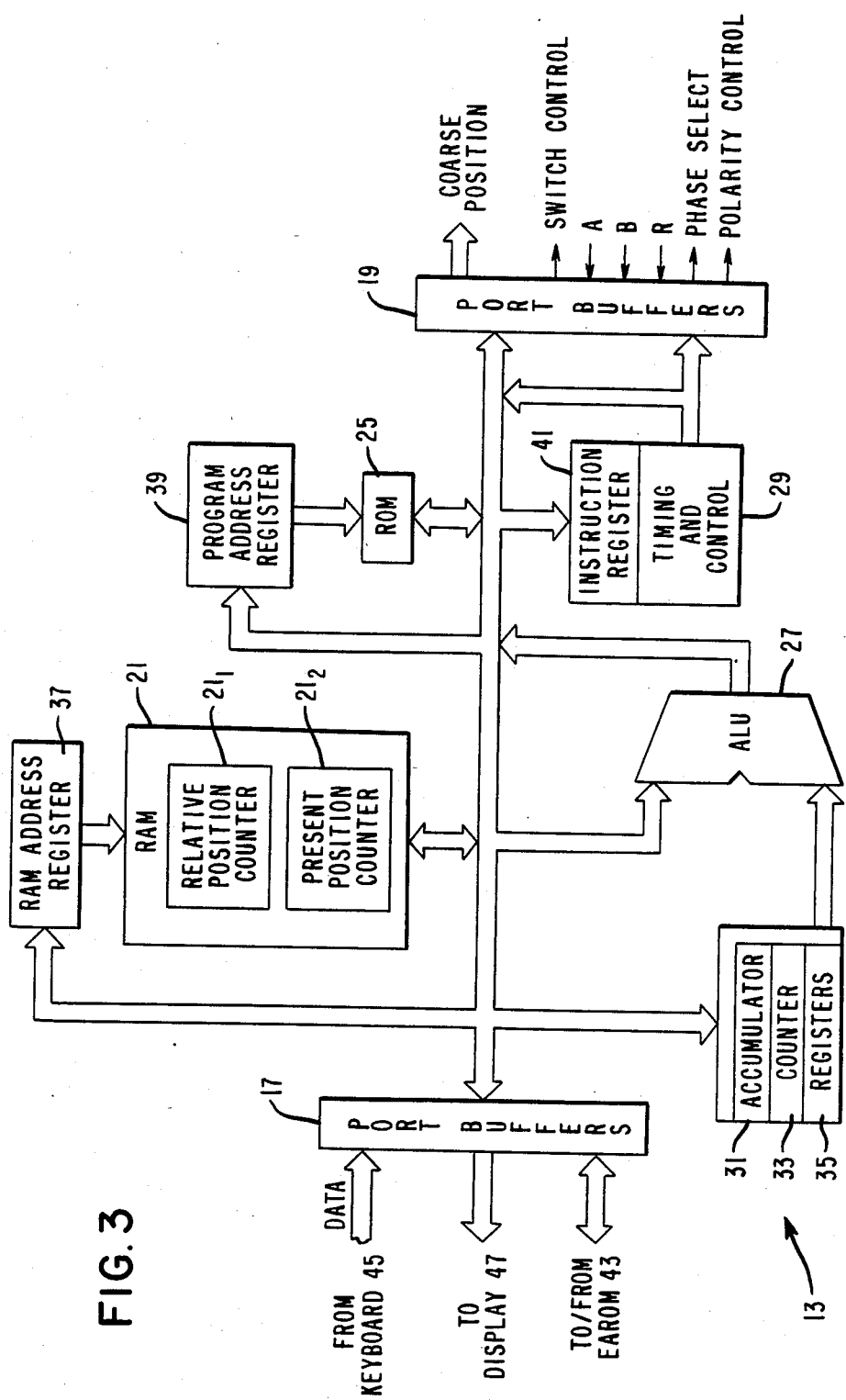
FIG. 3 is a simplified schematic block diagram of the processor of FIG. 1.

The system of FIG. 1 includes a processor 13, which is shown in more detail in FIG. 3, for selectively controlling the operation of the system in response to input data thereto. The processor 13 can be a computer, microprocessor or any other suitable computing device. For purposes of this description, the processor 13 is an 8051 AH microcomputer manufactured by Intel, Santa Clara, Calif.

As shown in FIG. 3, the microcomputer or processor 13 includes: port buffers 17 and 19 for inputting and outputting various types of information and control signals (to be explained); a random access memory (RAM) 21 for temporarily storing data; a read only memory (ROM) 25 for storing the software program to be performed, standard coarse position counts respectively associated with the characters shown in FIG. 2 and standard quadrant displacements or standard quadrant displacement signals (to be explained) associated with those standard coarse position counts; an arithmetic logic unit (ALU) 27 controlled by the software program in the ROM 25 for performing arithmetic operations; and a timing and control circuit 29 for controlling the operations of the processor 13. In addition, the processor 13 includes additional circuits, such as an accumulator 31, counter 33, bank of registers 35, RAM address register 37, program address register 39 and instruction register 41. The program address register 39 is controlled by the timing and control circuit 29 to access the main program and various subroutines, as well as the standard coarse position counts and their associated standard quadrant displacements, that are stored in the ROM 25. The RAM 21 includes a relative position counter $21_1$ and a present position counter $21_2$ (to be discussed). The counters $21_1$ and $21_2$ are software counters comprised of preselected memory locations in the RAM 21.

As indicated in FIG. 2, the standard coarse position counts and their associated standard quadrant displacements (stored in the ROM 25 of FIG. 3) are numerical or digital signals related to the standard rotational distances in a clockwise direction from a reference position $R_p$, located at the coarse position 0 or 720 of the typewheel 11, to each of the characters on the typewheel 11. For example, the first character 0 is 10 positions away from $R_p$, the second character 1 is 58 positions away from $R_p$, and so forth, with each of the remaining characters on the typewheel 11 being spaced 48 coarse positions from its adjacent characters. Thus, the standard coarse position counts for the typewheel characters 0, 1, 2, 3, 4, 5, 6, 7, 8, 9, Q4, Q3, Q5, Q2 and Q1 are digital signals which are respectively representative of the clockwise standard coarse positions 10, 58, 106, 154, 202, 250, 298, 346, 394, 442, 490, 538, 586, 634 and 682 around the exemplary 720-position circumference C of the typwheel 11.

Referring back to FIG. 1, an erasable alterable read only memory (EAROM) 43 is coupled to the processor 13. Before the initial power-up of the system of FIG. 1, the EAROM 43 just contains "garbage" or meaningless digital signals. Upon the initial power-up of the system of FIG. 1, the standard coarse position counts and associated standard quadrant displacements of the typewheel characters shown in FIG. 2 are selectively read out of the ROM 25 (FIG. 3) and also stored in the EAROM 43 to initialize the EAROM 43. However, only these standard coarse position counts and standard quadrant displacements stored in the initialized EAROM 43 can be subsequently altered or modified (to be explained). As a result, these data contents of the EAROM 43 will henceforth be referred to merely as coarse position counts and their associated quadrant displacements.

Each character on the typewheel 11 has a stopping point or position associated with it. That stopping position for a given character is determined by the coarse position count in the EAROM 43 for that given character, as modified by the associated quadrant displacement signal. A quadrant displacement signal can be used to modify its associated coarse position count for a character by, for example, quadrant displacements of 0, 1, 2, 3, 4, −1, −2, −3 and −4, where a quadrant displacement of 0 means no displacement from an associated standard coarse position, the quadrant displacements of 1, 2, 3 and 4 are displacements in a counterclockwise (CCW) direction, and the quadrant displacements of −1, −2, −3 and −4 are displacements in a clockwise (CW) direction. Each quadrant displacement corresponds to one fourth of the rotational distance between two adjacent standard coarse positions on the typewheel 11. In other words, a total of four quadrant displacements corresponds to a change of one count in the associated coarse position count stored in the EAROM 43.

Command and fine correction signals to position the typewheel 11 can be selectively entered onto a data line 44 to the processor 13 by means of, for example, a keyboard 45. It should, however, be realized that any other suitable data source could be used to input positioning data to the processor 13. Keys (not shown) on the keyboard 45 respectively correspond to the characters on the typewheel 11. The keyboard 45 may also include control keys (not shown) to control the printing operation of the typewheel 11. Associated with the keyboard 45 is a video display or CRT (cathode ray tube) display 47 for enabling a user of the keyboard 45 to monitor the data that the user enters into the system via the processor 13.

The system of FIG. 1 has two modes of operation—a learn mode and an operate mode. In the learn mode the user can adjust the stopping position of each of the characters on the typewheel 11 by entering fine corrections signals into the processor 13 via the keyboard 45. In the operate mode the user can cause any desired character on the typewheel 11 to be automatically positioned to its adjusted stopping position by entering an associated command signal into the processor 13 via the keyboard 45.

Initially, before the character positions are adjusted in the learn mode, the EAROM 43 stores coarse position counts corresponding to the standard coarse positions of the characters shown in FIG. 2 and adjustment signals representative of the unmodified positions of the characters on the typewheel 11. Thus, before the learn mode, the initial stopping position of each character on the typewheel 11 is midway between two associated adjacent standard coarse positions, or at quadrant 2. Quadrant 2 is two quadrant displacements in the clockwise direction past the standard coarse position for any given character on the typewheel 11. For example, the initial stopping position for character 2 on the typewheel 11 is at standard coarse position 106 (FIG. 2), quadrant 2 or, in other words, 106 and 2.

The operation of the system of FIG. 1 will now be explained during each of the learn and operate modes of operation.

LEARN MODE

It will be recalled that prior to the learn mode the EAROM 43 was initialized to quadrant 2 for each of the characters on the typewheel 11. Assume that the typewheel 11 is presently at coarse position 682 (FIG. 2), quadrant 2 and that it is desired to adjust the quadrant displacement signal for character 0 on the typewheel 11 to obtain a stopping position for the character 0 that will give the best printing for that character 0.

In the learn mode, a user depresses, for example, the 0 key (not shown) on the keyboard 45. This causes a command signal for the character 0 to be applied to the processor 13 by way of the data line 44. In response to such a command signal, the processor 13 fetches from the EAROM 43 the (standard) coarse position count 10 for the character 0 and the quadrant displacement signal 2 (that is initially associated with that character 0). Under the control of the program stored in its ROM 25 (FIG. 3), the processor 13 selectively combines the extracted (standard) coarse position count 10, the extracted quadrant displacement signal 2, and the present coarse position count 682 associated with the present position of the typewheel 11 in its ALU 27 (FIG. 3) to develop a relative position count (RPC) indicative of the number of coarse positions that the typewheel 11 is to be moved to position the character 0 to its print station 12 (FIG. 2). As will be explained later, the processor 13 always knows where the typewheel 11 is positioned at any given time. Thus, at the time that the user depresses the 0 key on the keyboard 45, the processor 13 knows that the typewheel 11 is at coarse position 682 (FIG. 2) and that the typewheel 11 is to be moved to coarse position 10 (FIG. 2).

Through the operation of the ALU 27 (FIG. 3), the processor 13 knows that the RPC=48 and that the typewheel 11 should be moved 48 coarse positions in a counter-clockwise direction to position the character 0 on the typewheel 11 to the print station 12 (FIG. 2) in the shortest time. As a result, the processor 13 preloads its internal relative position counter $21_1$ in the RAM 21 (FIG. 3) with a count of 48.

In addition to preloading the software relative position counter $21_1$ (FIG. 3) with the count 48, the processor 13 also develops a digital coarse position signal to subsequently move the typewheel 11 in the correct direction (counter-clockwise in this example) and at the proper speed at any given time. At appropriate subsequent times the processor 13 also develops a switch control signal, a phase select signal and a polarity control signal to control the quadrant displacement position 2 initially associated with the standard coarse position 10 of the typewheel 11.

The digital coarse position signal from the processor 13 is converted to an analog coarse position signal by a digital to analog converter (DAC) 49 before being applied to an electronic switch 51. As long as a switch control signal is not applied from the processor 13 to the electronic switch 51, the switch 51 passes the analog coarse position signal from the DAC 49 to a power amplifier 53. In response to the analog coarse position signal the power amplifier 53 develops a drive signal for a servo motor 55. The polarity of that drive signal determines the direction of rotation of a shaft 57 of the servo motor 55. For example, assume that a positive drive signal would cause a clockwise rotation of the shaft 57, while a negative drive signal would cause a counterclockwise rotation of the shaft 57.

The typewheel 11 and a suitable incremental position optical encoder 59 are both coupled to the shaft 57 of the servo motor 55, either directly to the shaft 57 or by way of a gear train assembly (not shown). Whenever the servo motor 15 is energized by a drive signal from the power amplifier 53, its shaft 57 rotates both the typewheel 11 and the optical encoder 59, causing the encoder 59 to develop and apply phase A ($\phi$A), phase B ($\phi$B) and reference ($\phi$R) signals to an analog loop 61. These $\phi$A, $\phi$B and $\phi$R signals together provide to the analog loop 61 incremental positional information indicative of the absolute position of the shaft 57 of the servo motor 55 and, hence, of the typewheel 11 as well. The optical encoder 59 will be explained in greater detail by now referring to FIG. 4.

Figure 4:
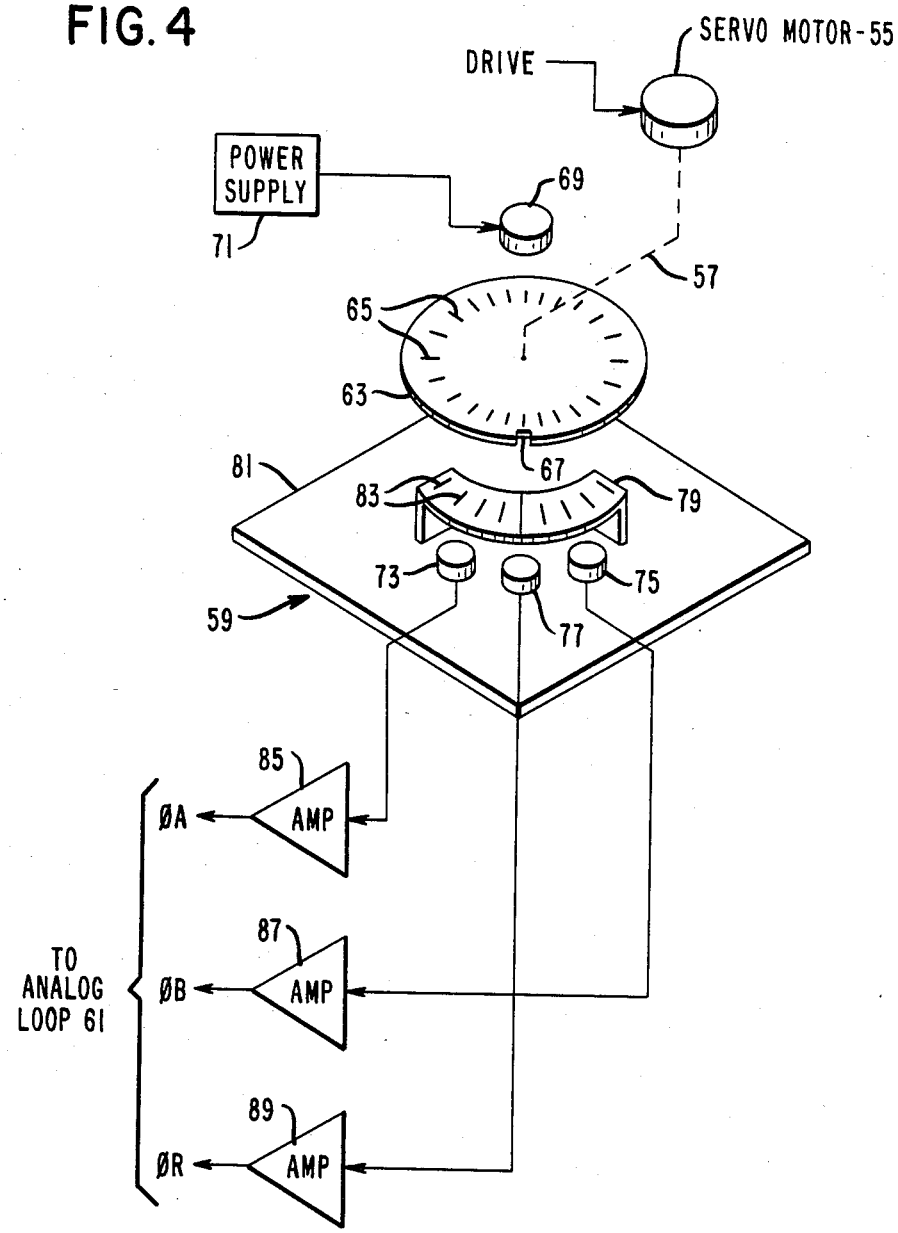
FIG. 4 illustrates a typical implementation of the optical encoder of FIG. 1.

FIG. 4 illustrates a typical implementation of the optical encoder 59. The encoder 59 includes a substantially opaque movable disk 63 axially coupled to the shaft 57 of the servo motor 55. Around the surface of the movable disk 63 is a pattern of 720 clear, angularly-disposed and equally-spaced narrow apertures or lines 65. A single, clear, angularly-disposed reference aperture 67 is positioned on the movable disk 63 separate and apart from the apertures 65. A light source 69, disposed on one side of the movable disk 63, receives power from a power supply 71 to illuminate the movable disk 63. A group of photosensors 73, 75 and 77 are selectively disposed on the other side of the disk 63. An arcuately-shaped reticle 79 is mounted to a frame 81 of the encoder 59 between the movable disk 63 and the group of photosensors 73, 75 and 77 in a spaced, parallel relationship with the movable disk 63. The frame 81 also supports the light source 69 and photosensors 73, 75 and 77.

The reticle 79 is substantially opaque, but has clear, equally-spaced narrow apertures or lines 83 formed therein. The spacing between adjacent apertures 83 on the reticle 79 corresponds to the spacing between adjacent apertures 65 on the movable disk 63.

Energization of the servo motor 55 by the drive signal from the power amplifier 53 (FIG. 1) causes the movable disk 63 to rotate with respect to the reticle 79. The relative orientation of the apertures 65 of the movable disk 63 and the apertures 83 of the reticle 79 as the disk 63 is rotated causes the intensities of the light received by the photosensors 73 and 75 from the light source 69 via the apertures 65 in the disk 63 and selected apertures 83 in the reticle 79 to vary in a sinusoidal manner. The photosensors 73 and 75 are so positioned with respect to the reticle 79 that the light received by the photosensor 73 produces an in-phase signal, while the light received by the photosensor 75 produces a quadrature signal.

In addition to the in-phase and quadrature signals from the photosensors 73 and 75, the encoder 59 provides a reference signal from the photosensor 77 in the following manner. The single aperture 67 on the movable disk 63 is used in conjunction with the light source 69 and the photosensor 77 to detect a unique reference position of the movable disk 63 in relation to the frame 81 and the reticle 79. When the movable disk 63 is in a position where the single aperture 67 is aligned with the photosensor 77, a light path is established from the light source 69 to the photosensor 77. This causes the photosensor 77 to develop a reference pulse or signal which is only generated when the movable disk 63 is in a unique position once per revolution with respect to the reticle 79. This reference signal is used to establish a reference position for the shaft 57 of the servo motor 55 and, hence, to establish the previously discussed reference position $R_p$ (FIG. 2) on the typewheel 11.

The output signals of the photosensors 73, 75 and 77 are amplified by amplifiers 85, 87 and 89 to respectively produce the in-phase signal (phase A or $\phi$A), the quadrature signal (phase B or $\phi$B) and the reference signal ($\phi$R).

The optical encoder 59 can be implemented by means of encoder type R-2000, manufactured by Renco, Division of Electro-Craft Corporation, Goleta, Calif.

Figure 5:
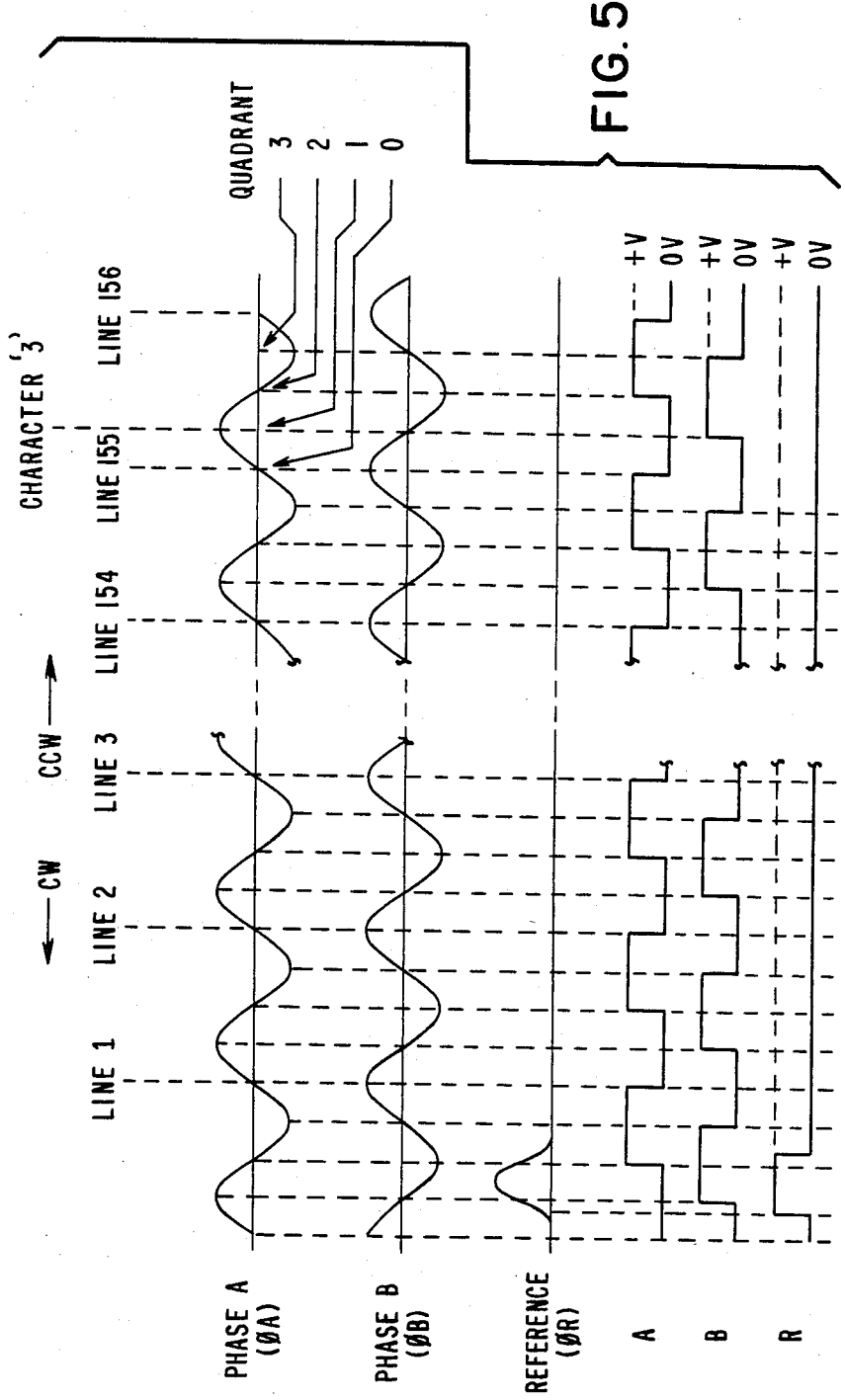
FIG. 5 illustrates waveforms useful in explaining the operation of the servo control system of FIG. 1.

The phase A ($\phi$A), phase B ($\phi$B) and reference ($\phi$R) signals produced by the rotation of the optical encoder 59 by the servo motor 55 are shown in FIG. 5. The $\phi$A signal is in the shape of a sine wave with one full cycle of the sine wave being generated by the rotation of the movable disk 63 (FIG. 4) of the optical encoder 59 by an amount equal to the distance between adjacent lines 65 on the movable disk 63. Similarly, the $\phi$B signal is in the shape of a cosine wave with one full cycle of the cosine wave being generated by the rotation of the movable disk 63 of the optical encoder 59 by an amount equal to the distance between adjacent lines 65 on the movable disk 63.

Since it was stated that the movable disk 63 of the optical encoder 59 has 720 equally-spaced lines disposed therearound, each line on the movable disk 63 of the encoder 59 is separated from its adjacent line on the movable disk 63 by 0.5 degrees. Since both the typewheel 11 and encoder 59 are commonly driven by the servo motor 55, as discussed before, each time that the encoder 59 is rotated through 0.5 degrees the typewheel 11 is also rotated through 0.5 degrees. As a result, the number of sine waves generated by the rotation of the movable disk 63 of the encoder 59 indicates the incremental or coarse position of the shaft 57 of the servo motor 55 and therefore also indicates the incremental or coarse position of the typewheel 11. Thus, as shown in FIG. 2, the encoder (59) line counts correspond to the 720 positions on the typewheel 11.

An example of the quadrants or quadrant positions 0, 1, 2 and 3 is shown in FIG. 5 between lines 155 and 156 in the waveforms of $\phi A$ and $\phi B$.

Figure 6:
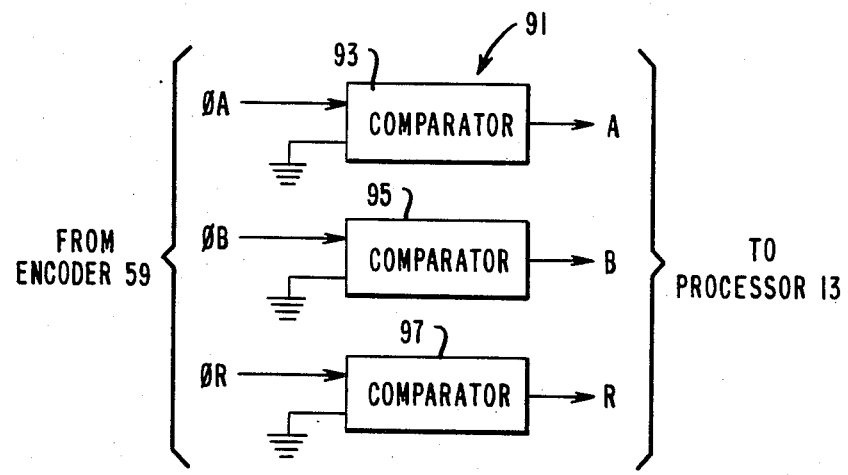
FIGS. 6 and 7 are schematic block diagrams of circuits included in the analog loop of FIG. 1.

The $\phi A$, $\phi B$ and $\phi R$ signals from the encoder 59 are applied to the analog loop 61. More specifically, the $\phi A$, $\phi B$ and $\phi R$ signals are applied to a conversion section 91 of the analog loop 61 which is shown in FIG. 6. The conversion section 91 of FIG. 6 is comprised of comparators 93, 95 and 97 which respectively receive the input $\phi A$, $\phi B$ and $\phi R$ signals. Each of the comparators 93, 95 and 97 compares its associated input signal against a ground potential to develop a high output when the associated input signal is equal to or less than the ground potential and a low output when the associated input signal is greater than the ground potential. In this manner the comparators 93, 95 and 97 respectively change the $\phi A$, $\phi B$ and $\phi R$ signals into the digital or square wave signals A, B and R shown in FIG. 5.

The digital signals A, B and R from the conversion section 91 (FIG. 6) of the analog loop 61 are applied to the processor 13 as the encoder 59 is being rotated by the servo motor 55. The direction of rotation of the encoder 59, and hence of the typewheel 11, is indicated in FIG. 5 by the order in which the A and B signals fall to a low level. If the A signal falls to a low level before the B signal does, the encoder 59 (and hence the typewheel 11) is being rotated in a CW direction. Similarly, if the B signal falls to a low level before the A signal does, the encoder 59 (and hence the typewheel 11) is being rotated in a CCW direction.

The software present position counter $21_2$, in the RAM 21 (FIG. 3) of the processor 13, is utilized to keep track of the present coarse position of the encoder 59 and typewheel 11 at all times. Each time that the R signal falls to a low level, the software present position counter $21_2$ of the RAM 21 (FIG. 3) is reset. With a CCW rotation of the encoder 59, the present position counter $21_2$ is reset to a zero count at the time of the falling edge of the R signal and then its count is incremented at the time of each falling edge of the A signal to maintain a line count of the lines on the movable disk 63 (FIG. 4) of the encoder 59. Similarly, with a CW rotation of the encoder 59, the present position counter $21_2$ is reset to a 720 count at the time of the falling edge of the R signal and then its count is decremented at the time of each rising edge of the A signal.

It will be recalled that, in this discussion on the learn mode, it was assumed that the typewheel 11 was at position 682 (FIG. 2), quadrant 2, that the typewheel 11 was to be moved 48 positions in a CCW direction to position 10, quadrant 2, and that the relative position count 48 was preloaded into the relative position counter $21_1$ in the RAM 21 (FIG. 3) of the processor 13. Thus, when the servo motor 55 is energized by the drive signal from the power amplifier 53, the typewheel 11 starts to rotate CCW toward the commanded coarse position 10 (FIG. 2) and the encoder 59 selectively generates the $\phi A$, $\phi B$ and $\phi R$ signals which are converted into the square wave signals A, B and R.

Since the encoder 59 and typewheel 11 are both being rotated CCW, the counts of the relative position counter $21_1$ and the present position counter $21_2$ in the RAM 21 (FIG. 3) are respectively decremented and incremented by one at the time of each falling edge of the A signal (FIG. 5). The count of the present position counter $21_2$ in the RAM 21 (FIG. 3) is reset to zero at the time of the falling edge of the R signal. After 48 falling edges of the A signal have been counted, the relative position counter $21_1$ in the RAM 21 (FIG. 3) has a count of zero to indicate that the commanded coarse position 10 has been reached, while the present position counter $21_2$ in the RAM 21 (FIG. 3) has a count of 10 to indicate the present coarse position 10 (FIG. 2) of the typewheel 11.

Figure 7:
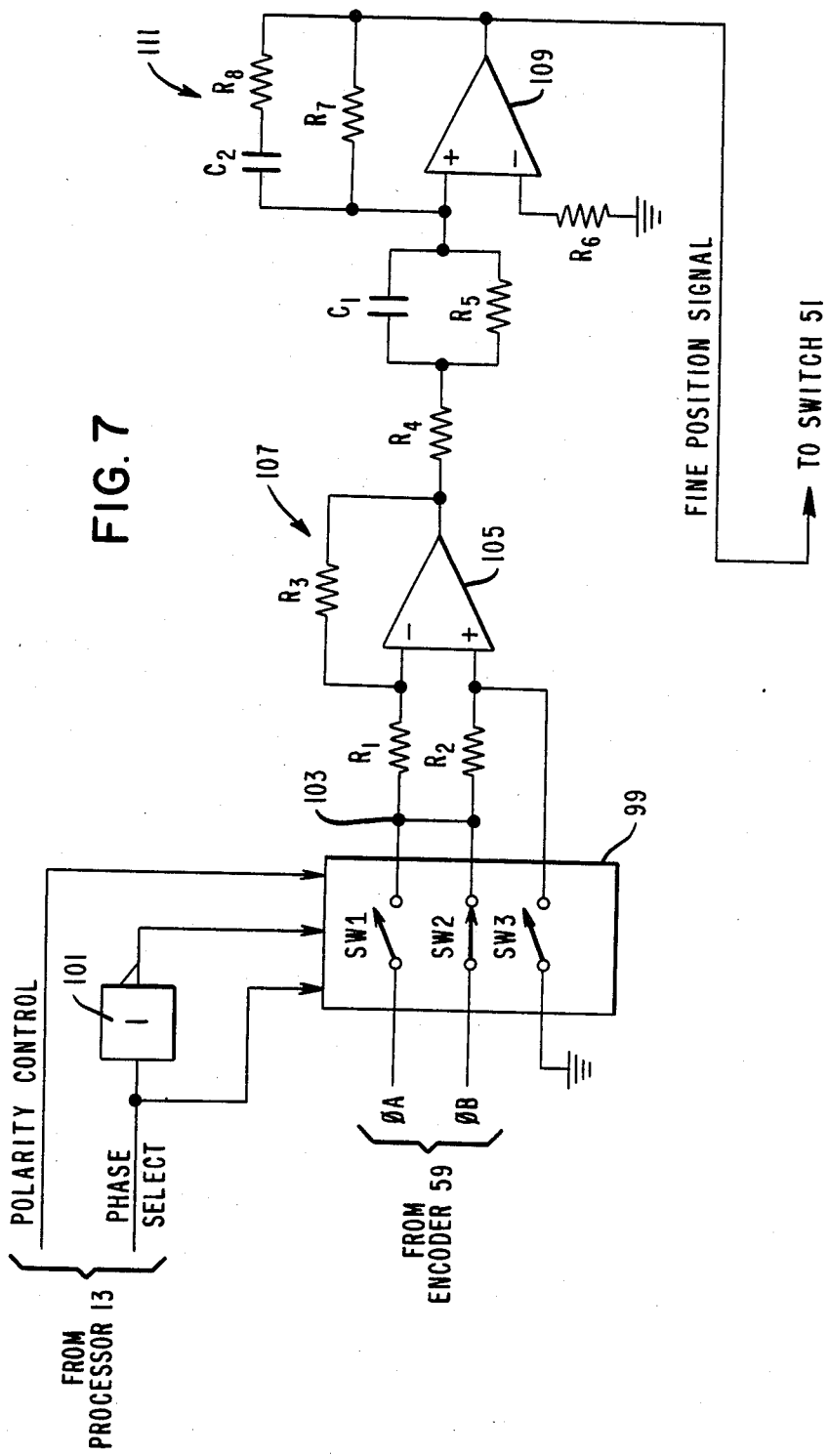

As will be discussed later in relation to FIG. 7, before the coarse position 10 (FIG. 2) on the typewheel 11 is reached, the processor 13 selectively develops the phase select and polarity control signals to enable the analog loop 61 to develop and apply the proper fine position signal to the electronic switch 51. In this example, the proper fine position signal is that signal which will subsequently cause the servo motor 55 to stop the typewheel 11 at coarse position 10, quadrant 2.

At the proper time after the selected coarse position 10 is reached, the processor 13 develops a switch control signal to cause the electronic switch 51 to switch its input from the output of the DAC 49 to the fine position signal output of the analog loop 61. Thus, after the coarse position 10 is reached, the fine position signal from the analog loop 61 is passed by the switch 51 to the power amplifier 53. As a consequence, the power amplifier 53 develops an analog drive signal to cause the servo motor 55 to null out at the time that the typewheel 11 reaches coarse position 10, quadrant 2. At this time a print hammer (not shown) is energized at the print station 12 (FIG. 2) to cause the character 0 on the typewheel 11 to be printed on paper (not shown). If the print quality of the character 0 is not satisfactory to the user at this time, the user then inputs fine correction signals into the processor 13 via the keyboard 45 to adjust or select another stopping position of the typewheel 11 by changing the quadrant displacement signal stored in the EAROM 43 for the selected character 0. For example, the quadrant displacement signal for character 0 could be changed from an initialized quadrant displacement of 2 to, for example, any one of the quadrant displacements of 0, 1, 3, 4, −1, −2, −3 and −4.

After the quadrant displacement signal for character 0 has been changed or adjusted to produce a different number of quadrant displacements, another print cycle is initiated and the print quality of the character 0 is again observed. If the print quality of the character 0 is still not satisfactory, the procedure is repeated, with a print cycle being initiated and the print quality of the character 0 being observed after each adjustment of the stopping position of the character 0.

When the print quality of the character 0 is satisfactory to the user, a stopping position for the character 0 is established. The stopping position that produced the best print quality for the character 0 is comprised of a resultant coarse position count and a resultant number of quadrant displacements (0, 1, 2 or 3) from that count. The resultant coarse position count is then stored in the EAROM 43, replacing the standard coarse position count initially stored in the EAROM 43 for the character 0. Similarly, the resultant displacement or number of quadrant displacements now associated with the character 0 is also stored in the EAROM 43, replacing the initialized adjustment signal of 2 quadrant displacements for the character 0.

For example, assume that the character 0 was found to require an additional CCW displacement of 5 quadrants, in addition to the initialized 2 quadrant displacements, to obtain a satisfactory print quality. In this case the typewheel 11 would have to be rotated a total of 7 quadrant displacements CCW after the standard coarse position 10 on the typewheel 11 reached the print station 12 (FIG. 2). Since there are 4 quadrant displacements (0, 1, 2 and 3) between adjacent standard coarse positions, the stopping position for character 0 would then be represented by coarse position count 11, quadrant 3. This new coarse position count 11 and its new associated adjustment signal corresponding to 3 quadrant displacements would then be stored in the EAROM 43 for the character 0. In a similar manner, it can be seen that an adjustment of shifting character 0 by 3 quadrant displacements in the CW direction would shift the resultant stopping position of character 0 to coarse position 9, quadrant 3.

The above described procedure is repeated during the learn mode for each of the remaining characters on the typewheel 11. Thus, at the end of the learn mode, the EAROM 43 stores the resultant coarse position counts for the characters on the typewheel 11 and also stores the resultant adjustment signals (or quadrant displacements) associated with those characters. As a result, the EAROM 43 stores the character-to-character variations which produce the best quality of print for all of the characters on the typewheel 11.

Before discussing the operate mode of operation, the circuitry of FIG. 7 will now be discussed to show how the fine position signal is produced for each of the quadrants 0, 1, 2 and 3 between two adjacent lines, such as lines 155 and 156 (FIG. 5).

An electronic switch assembly 99, comprised of electronic switches SW1, SW2 and SW3, is selectively controlled by the phase select and polarity control signals from the processor 13. A logically high phase select signal causes switch SW1 to close. On the other hand, a logically low phase select signal is logically inverted by an inverter 101 to cause switch SW2 to close. Thus, the switches SW1 and SW2 are operated in opposition to each other such that when the phase select signal is high SW1 is closed and SW2 is open, and when the phase select signal is low SW1 is open and SW2 is closed. A logically high polarity control signal causes the switch SW3 to close.

The outputs of switches SW1 and SW2, as well as one side of each of resistors $R_1$ and $R_2$, are commonly connected to a junction 103. The other sides of resistors $R_1$ and $R_2$ are respectively connected to the inverting ($-$) and non-inverting ($+$) inputs of an amplifier 105 which includes a negative feedback resistor $R_3$ connected between the output of the amplifier 105 and the inverting input ($-$) of the amplifier 105. The resistors $R_1$, $R_2$ and $R_3$ can each have an exemplary value of 1.21 kilohms. The amplifier 105 and resistors $R_1$, $R_2$ and $R_3$, in combination, form an operational amplifier 107 having a unity gain.

Switch SW3 is connected between ground and the non-inverting input ($+$) of the amplifier 105 to enable the non-inverting input ($+$) of the amplifier 105 to be grounded whenever the polarity control signal is high.

The output of the operational amplifier 107 is coupled through a resistor $R_4$ and a parallel-connected resistor $R_5$ and capacitor $C_1$ combination to the non-inverting input ($+$) of an amplifier 109 which, in turn, has its inverting input ($-$) returned to ground by way of resistor $R_6$. A negative feedback resistor $R_7$ is coupled between the output of the amplifier 109 and the non-inverting input ($+$) of the amplifier 109. A serially connected combination of capacitor $C_2$ and resistor $R_8$ is connected across resistor $R_7$. The amplifier 109, resistors $R_4$–$R_8$ and capacitors $C_1$ and $C_2$ form an operational amplifier 111, with the resistors $R_4$, $R_5$, $R_7$ and $R_8$ and capacitors $C_1$ and $C_2$ providing the proper bandwidth characteristics for that operational amplifier 111.

Exemplary values for the resistors $R_4$–$R_8$ and capacitors $C_1$ and $C_2$ are respectively 1.5 kilohms, 148 kilohms, 47 kilohms, 47 kilohms, 1.3 kilohms, 15 nanofarads and 470 picofarads. The output of the operational amplifier 111 provides the fine position signal which is provided to the switch 51 (FIG. 1).

The operation of the circuitry of FIG. 7 will now be explained by also referring to FIGS. 1 and 5 and the following TABLE.

TABLE

| Quadrant Of Coarse Position Line | Phase Select Signal/ Selected Phase | Polarity Control Signal/ Selected Polarity | Switch Control Signal Goes High After Pass Quadrant |
| --- | --- | --- | --- |
| 0 | high/ØA | high/inverted | 0 |
| 1 | low/ØB | high/inverted | 0 |
| 2 | high/ØA | low/non-inverted | 1 |
| 3 | low/ØB | low/non-inverted | 2 |

If the fine position signal from operational amplifier 111 is to be such that the typewheel 11 (FIG. 1) will be positioned to line 155, quadrant 0 (FIG. 5), then both the phase select and polarity control signals are set high by the processor 13 (FIG. 1). A high phase select signal closes switch SW1 and opens switch SW2, while a high polarity control signal closes switch SW3 causing the non-inverting input ($+$) of operational amplifier 107 to be grounded. As a result, the $\phi A$ signal from encoder 59 passes through closed switch SW1 to the inverting input ($-$) of the operational amplifier 107. Thus, the $\phi A$ signal is inverted by the operational amplifier 107 before being filtered and passed through the operational amplifier 111 to the switch 51 as the fine position signal. Right after the line 155 (FIG. 5) is reached, which occurs in this case when the relative position counter counter $21_1$ in the RAM 21 (FIG. 3) has been decremented to an RPC=0, the processor 13 sets the switch control signal high. The high switch control signal causes the switch 51 (FIG. 1) to switch over to the analog loop 61 (FIG. 1) to pass the inverted $\phi A$ signal as the fine position signal to the servo motor 55 by way of the power amplifier 53. At this time the inverted $\phi A$ signal is a negative going signal which causes the servo motor 55 to reverse its direction of rotation and null out and stop at quadrant 0. As a consequence, the typewheel 11 (FIG. 2) also stops at line 155, quadrant 0.

If the fine position signal from the operational amplifier 111 is to be used to position the typewheel 11 (FIG. 1) to line 155, quadrant 1 (FIG. 5), then the processor 13 (FIG. 1) sets the phase select signal low and the polarity control signal high. As a result, SW2 closes to select $\phi B$ from the encoder 59 and SW3 closes to cause an inverted $\phi B$ signal to be developed by operational amplifier 107 and filtered and amplified by operational amplifier 111 before being applied to the switch 51 as the fine position signal. Right after the line 155 (FIG. 5) is reached, which occurs in this case when the relative position counter $21_1$ in the RAM 21 (FIG. 3) has been decremented to an RPC=0, the processor 13 sets the switch control signal high. The high switch control signal causes the switch 51 to switch over to the analog loop 61 to pass the inverted $\phi B$ signal as the fine position signal to the servo motor 55 by way of the power amplifier 53. At this time the inverted $\phi B$ signal is a positive going signal which causes the servo motor 55 to null out and stop at quadrant 1 when the inverted $\phi B$ signal falls to zero. As a consequence, the typewheel 11 (FIG. 2) also stops at line 155, quadrant 1.

If the fine position signal from the operational amplifier 111 is to be used to position the typewheel 11 (FIG. 1) to line 155, quadrant 2 (FIG. 5), then the processor 13 (FIG. 1) sets the phase select signal high and the polarity control signal low. As a result, SW1 closes to select $\phi A$ from the encoder 59 and SW3 remains open to cause a non-inverted $\phi A$ signal to be developed by operational amplifier 107 and filtered and amplified by operational amplifier 111 before being applied to the switch 51 as the fine position signal. Right after the processor 13 detects the falling edge of the B signal (FIG. 5) after the line 155 is reached (FIG. 5), the processor 13 sets the switch control signal high. The high switch control signal causes the switch 51 to switch over to the analog loop 61 to pass the non-inverted $\phi A$ signal as the fine position signal to the servo motor 55 by way of the power amplifier 53. At this time the non-inverted $\phi A$ signal is a positive going signal which causes the servo motor 55 to null out and stop at quadrant 2 when the non-inverted $\phi A$ signal decreases to zero. As a consequence, the typewheel 11 (FIG. 2) also stops at line 155, quadrant 2.

Finally, if the fine position signal from the operational amplifier 111 is to be used to position the typewheel 11 (FIG. 1) to line 155, quadrant 3 (FIG. 5), then the processor 13 (FIG. 1) sets both the phase select and polarity control signals low. As a result, SW2 closes to select $\phi B$ from the encoder 59 and SW3 remains open to cause a non-inverted $\phi B$ signal to be developed by operational amplifier 107 and filtered and amplified by operational amplifier 111 before being applied to the switch 51 as the fine position signal. Right after the processor 13 detects the rising edge of the A signal (FIG. 5) after the line 155 is reached (FIG. 5), the processor 13 sets the switch control signal high. The high switch control signal causes the switch 51 to switch over to the analog loop 61 to pass the non-inverted $\phi B$ signal as the fine position signal to the servo motor 55 by way of the power amplifier 53. At this time the non-inverted $\phi B$ signal is a positive going signal which causes the servo motor 55 to null out and stop at quadrant 3 when the non-inverted $\phi B$ signal decreases to zero. As a consequence the typewheel 11 (FIG. 2) also stops at line 155, quadrant 3.

OPERATE MODE

As mentioned before, in the operate mode any desired character on the typewheel 11 can be automatically positioned to its adjusted stopping position. In the following description of the operate mode, assume that: the present position of the typewheel 11 is at character 0; the adjusted stopping position for character 0 is given by coarse position count 10, quadrant 1; the next character desired is 3; and the adjusted stopping position for character 3 is given by coarse position count 155, quadrant 3. FIGS. 1, 2, 3, 5 and 7 will be referred to in the following discussion.

When a user depresses the 3 key (not shown) on the keyboard 45, a command signal for the character 3 is applied to the processor 13 by way of the data line 44. In response to such a command signal, the processor 13 fetches from the EAROM 43 both the coarse position count 155 for the character 3 and the associated displacement signal (indicative of 3 quadrant displacements) for the character 3. As previously discussed, the processor 13 knows where the typewheel 11 is at all times. Therefore, the processor 13 knows that the typewheel 11 is at character 0 which is given by the coarse position count 10.

The processor 13 internally computes the relative position count (RPC), or the number of coarse positions or lines that the typewheel 11 has to be moved to position the desired character 3 to the print station 12 (FIG. 2), by subtracting the coarse position count 10 from the coarse position count 155. Thus, the processor 13 computes an RPC=145 and knows that the typewheel 11 has to be moved by 145 counts in the CCW direction. As a result, the processor 13 preloads its relative position counter $21_1$ in the RAM 21 (FIG. 3), with a count of 145 and generates a digital coarse position signal of the proper polarity. This digital coarse position signal from the processor 13 is converted to an analog signal by DAC 49, passed through switch 51 and then utilized by the power amplifier 53 to supply a drive signal to the servo motor 55.

As the servo motor 55 is energized by the output of the power amplifier 53, it starts to rotate both the typewheel 11 and the encoder 59 in a CCW direction. As a result, the encoder 59 selectively generates the analog $\phi A$, $\phi B$ and $\phi R$ signals to indicate the absolute position of the typewheel 11. It will be recalled that these analog signals $\phi A$, $\phi B$ and $\phi R$ are respectively converted into the corresponding digital signals A, B and R by the conversion section 91 (FIG. 6) of the analog loop 61. The processor 13 uses each falling edge of the A signal to decrement the relative position counter $21_1$ in the RAM 21 (FIG. 3) each time that a line (FIG. 5) on the encoder 59 is detected.

The servo motor 55, which is effectively controlled by the coarse position signal from the processor 13 goes through a sequence of acceleration and then deceleration as the standard coarse position 155 is approached. When the relative position counter $21_1$ in the RAM 21

(FIG. 3) has been decremented to a relative position count (RPC) of zero, the servo motor 55 may still have one of 4 positions to settle at, depending on the number of quadrant displacements (0, 1, 2 or 3) desired. In the given case of the character 3, the quadrant is to be 3. Thus, the servo motor 55 continues driving the typewheel 11 and encoder 59 after RPC=0. Right after the processor 13 detects the rising edge of the A signal (FIG. 5) after the line 155 is reached (FIG. 5), as previously described in relation to (FIG. 7), the processor 13 sets the switch control signal high. The high switch control signal causes the switch 51 to switch over to the analog loop 61 to pass the non-inverted $\phi B$ signal (FIG. 7) as the fine position signal. This non-inverted $\phi B$ signal is then applied to the servo motor 55 via the power amplifier 53 to cause the servo motor 55 to null out and stop at quadrant 3 when the non-inverted $\phi B$ signal decreases to zero. As a result the typewheel 11 (FIG. 2) is stopped at the desired stopping position for character 3, namely line 155, quadrant 3.

A similar operation would occur for the positioning of any of the other characters on the typewheel 11 to the print station 12 (FIG. 2).

The invention thus provides a control and adjustment system, and method therefor, for precisely positioning a movable member to a desired position. The system utilizes the quadrant information provided by in-phase and quadrature signals from an optical encoder attached to the shaft of a servo motor driving the movable member to improve the resolution of positioning the movable member by a factor of four. An erasable adjustable read only memory is used to store the coarse position counts and the fine adjustment information for a plurality of selectable angular positions of the movable member.

While the salient features of the invention have been illustrated and described, it should be readily apparent to those skilled in the art that many changes and modifications can be made in the system and method of the invention presented without departing from the spirit and true scope of the invention. Accordingly, the present invention should be considered as encompassing all such changes and modifications of the invention that fall within the broad scope of the invention as defined by the appended claims.

I claim:

1. A typewheel servo control system comprising:
    a typewheel having characters spaced around its periphery;
    positioning means being responsive to a coarse position signal for a given character for positioning said typewheel to a preselected coarse position for said given character and being further responsive to a fine position signal for said given character for positioning said typewheel to a desired fine position for said given character;
    position sensing means coupled to said positioning means for developing a reference signal representative of a reference position of said typewheel and for further developing first and second signals having zero crossings representative of different coarse positions of said typewheel;
    a memory for storing adjustment information for a plurality of desired coarse positions and associated fine positions for said characters on said typewheel, each desired fine position being located at an associated one of said coarse positions or between two adjacent associated said coarse positions;
    processing means responsive to a command signal for a given character, adjustment information for a desired coarse position and associated fine position for said given character, said reference signal, and said first and second signals for selectively developing said coarse position signal for said given character and first, second and third control signals, said third control signal being developed after said preselected coarse position has been reached;
    first switching means responsive to said first and second signals and to the first and second control signals for developing said fine position signal for said given character; and
    second switching means being responsive to a first logical state of said third control signal for passing said coarse position signal for said given character to said positioning means and being responsive to a second logical state of said third control signal for passing said fine position signal for said given character to said positioning means.

2. The typewheel servo control system of claim 1 wherein said positioning means comprises:
    a servo motor having a shaft coupled to said typewheel and to said position sensing means; and
    a power amplifier responsive to said coarse and fine position signals for said given character for driving said servo motor to position said typewheel to said desired fine position for said given character.

3. The typewheel servo control system of claim 1 wherein said position sensing means comprises:
    an optical encoder which generates a pair of first and second signals during the transition of said typewheel between each two adjacent said coarse positions.

4. The typewheel servo control system of claim 1 wherein said memory is an erasable alterable read only memory and said control system further includes:
    a display coupled to said processing means for viewing each character printed by said typewheel; and
    a keyboard coupled to said processing means for entering characters to be printed and for enabling a user observing said display to alter said adjustment information to improve the print quality of said characters.

5. The typewheel servo control system of claim 1 wherein said reference signal and said first and second signals developed by said position sensing means are analog signals, said coarse position signal developed by said processing means is a digital signal, said processing means includes a processor and first converting means coupled between said position sensing means and said processor for converting said reference signal and said first and second signals from analog signals to digital signals before applying such digital signals to said processor, and said control system further includes:
    second converting means coupled between said processor and said second switching means for converting said coarse position signal from a digital signal to an analog signal before applying such analog coarse position signal to said second switching means.

6. The typewheel servo control system of claim 5 wherein said processor is a computer.

7. The typewheel servo control system of claim 1 wherein said first switching means comprises:
    third switching means for developing a third signal having the proper phase for said given character by selecting one of said first and second signals as a function of the logical state of said first control signal;

fourth switching means for developing a fourth signal having the proper polarity for said given character by inverting or not inverting said third signal as a function of the logical state of said second control signal; and output means responsive to said fourth signal for developing said fine position signal for said given character.

8. The typewheel servo control system of claim 1 wherein said processing means is a microcomputer.

9. The typewheel servo control system of claim 1 wherein:

said position sensing means is an optical encoder;
said memory is a read only memory; and
said first switching means comprises: third switching means for developing a third signal having the proper phase for said given character by selecting one of said first and second signals as a function of the logical state of said first control signal, fourth switching means for developing a fourth signal having the proper polarity for said given character by inverting or not inverting said third signal as a function of the logical state of said second control signal, and output means responsive to said fourth signal for developing said fine position signal for said given character.

10. The typewheel servo control system of claim 9 wherein said positioning means comprises:

a servo motor having a shaft coupled to said typewheel and to said optical encoder; and a power amplifier responsive to said coarse and fine position signals for said given character for driving said servo motor to position said typewheel to said desired fine position for said given character.

11. The typewheel servo control system of claim 10 wherein said reference signal and said first and second signals developed by said position sensing means are analog signals, said coarse position signal developed by said processing means is a digital signal, said processing means includes a processor and first converting means coupled between said optical encoder and said processor for converting said reference signal and said first and second signals from analog signals to digital signals before applying such digital signals to said processor, and said control system further includes:

second converting means coupled between said processor and said second switching means for converting said coarse position signal from a digital signal to an analog signal before applying such analog coarse position signal to said second switching means.

12. The typewheel servo control system of claim 11 further including:

a display coupled to said processor for viewing each character printed by said typewheel; and a keyboard coupled to said processor for entering characters to be printed and for enabling a user observing said display to alter said adjustment information in said read only memory to improve the print quality of said characters.

13. The typewheel servo control system of claim 12 wherein said processor is a digital computer.

14. A control system for precisely positioning a movable member from a present position to a desired position, said control system comprising:

position sensing means coupled to said movable member for developing a reference signal representative of a reference position of said movable member and for further developing first and second signals having zero crossings representative of different coarse positions of said movable member;

a memory for storing adjustment information for each of a plurality of preselected coarse positions and associated fine positions respectively associated with a plurality of coarse positions of said movable member, each preselected fine position being located at an associated coarse position or between two adjacent associated coarse positions;

positioning means being responsive to a coarse position signal for substantially positioning said movable member to a desired coarse position and being further responsive to a fine position signal for positioning said movable member to a desired preselected fine position associated with said desired coarse position;

processing means responsive to a command signal for said desired coarse position, adjustment information for said desired preselected coarse position and associated fine position associated with said desired coarse position, said reference signal, and said first and second signals for selectively developing said coarse position signal and first, second and third control signals, said third control signal being developed after said desired coarse position has been reached;

first switching means responsive to the first and second signals and to the first and second control signals for developing said fine position signal; and second switching means for selectively passing the coarse and fine position signals to said positioning means as a function of first and second logical states of said third control signal.

15. The control system of claim 14 wherein said first switching means comprises:

third switching means for developing a third signal having the proper phase by selecting one of said first and second signals as a function of the logical state of said first control signal;

fourth switching means for developing a fourth signal having the proper polarity by inverting or not inverting said third signal as a function of the logical state of said second control signal; and output means responsive to said fourth signal for developing said fine position signal.

16. The control system of claim 15 wherein:

said position sensing means comprises an optical encoder; and said positioning means comprises: a servo motor having a shaft coupled to said movable member and to said optical encoder, and a power amplifier responsive to said coarse and fine position signals for driving said servo motor to position said movable member to said desired preselected fine position associated with said desired coarse position.

17. The control system of claim 16 wherein said reference signal and said first and second signals developed by said position sensing means are analog signals, said coarse position signal developed by said processing means is a digital signal said processing means includes a processor and first converting means coupled between said optical encoder and said processor for converting said reference signal and said first and second signals from analog signals to digital signals before applying such digital signals to said processor, and said control system further includes:

second converting means coupled between said processor and said second switching means for converting said coarse position signal from a digital signal to an analog signal before applying such analog coarse position signal to said second switching means.

18. The control system of claim 17 wherein said processor is a digital computer.

19. A method for precisely positioning a movable member from a present position to a desired position, said method comprising the steps of:

developing a reference signal representative of a reference position of the movable member and first and second signals having zero crossings representative of different coarse positions of the movable member;

storing a plurality of desired coarse position counts and associated fine position signals respectively representative of a plurality of preselected fine positions that are respectively associated with a plurality of coarse positions of the movable member, with each preselected fine position being located at an associated coarse position or between two adjacent associated coarse positions of the movable member;

selectively developing a coarse position signal and first, second and third control signals in response to a command signal for a desired coarse position, a fine position signal representative of a desired preselected fine position associated with the desired coarse position, the reference signal, and the first and second signals;

generating the fine position signal in response to the first and second signals and the logical states of the first and second control signals;

selectively passing the coarse and fine position signals as a function of the logical state of the third control signal; and utilizing the coarse and fine position signals to position the movable member to the desired preselected fine position associated with the desired coarse position.

20. The method of claim 19 wherein said generating step includes the steps of:

selecting as a third signal one of the first and second signals as a function of the logical state of the first control signal;

deriving a fourth signal by inverting or not inverting the third signal as a function of the logical state of the second control signal; and utilizing the fourth signal to develop the fine position signal.

* * * * *